United States Patent
Li et al.

(10) Patent No.: US 12,169,958 B1
(45) Date of Patent: Dec. 17, 2024

(54) METHOD, SYSTEM AND DEVICE FOR ACQUIRING SEAWEED BED AREA, AND STORAGE MEDIUM

(71) Applicants: Shandong Marine Resource and Environment Research Institute, Yantai (CN); Yantai University, Yantai (CN)

(72) Inventors: Fan Li, Yantai (CN); Shaowen Li, Yantai (CN); Zhaowei Liu, Yantai (CN); Haixia Su, Yantai (CN); Huawei Qin, Yantai (CN); Zhanyu Wang, Yantai (CN)

(73) Assignees: Shandong Marine Resource and Environment Research Institute, Yantai (CN); Yantai University, Yantai (CN)

( * ) Notice: Subject to any disclaimer, the term of this patent is extended or adjusted under 35 U.S.C. 154(b) by 0 days.

(21) Appl. No.: 18/643,003

(22) Filed: Apr. 23, 2024

(30) Foreign Application Priority Data

Jan. 30, 2024  (CN) .......................... 202410121538.1

(51) Int. Cl.
  *G06V 10/50* (2022.01)
  *G06V 10/60* (2022.01)
  *G06V 20/10* (2022.01)

(52) U.S. Cl.
  CPC .............. *G06V 10/50* (2022.01); *G06V 10/60* (2022.01); *G06V 20/188* (2022.01)

(58) Field of Classification Search
  CPC ....... G06V 10/50; G06V 10/60; G06V 20/188
  See application file for complete search history.

(56) References Cited

FOREIGN PATENT DOCUMENTS

| CN | 114155198 A | 3/2022 |
| CN | 114648467 A | 6/2022 |
| CN | 117011181 A | 11/2023 |

OTHER PUBLICATIONS

Makarau, Aliaksei, et al. "Haze detection and removal in remotely sensed multispectral imagery." IEEE Transactions on Geoscience and Remote Sensing 52.9 (2014): 5895-5905. (Year: 2014).*
He, Kaiming, Jian Sun, and Xiaoou Tang. "Single image haze removal using dark channel prior." IEEE transactions on pattern analysis and machine intelligence 33.12 (2010): 2341-2353. (Year: 2010).*
Choi, Hyeongseok, et al. "Haze removal of multispectral remote sensing imagery using atmospheric scattering model-based haze thickness map." 2020 IEEE International Conference on Consumer Electronics-Asia (ICCE-Asia). IEEE, 2020. (Year: 2020).*
Komatsu, Teruhisa, et al. "Practical mapping methods of seagrass beds by satellite remote sensing and ground truthing." Coast Mar Sci 43.1 (2020): 1-25. (Year: 2020).*

* cited by examiner

*Primary Examiner* — Vu Le
*Assistant Examiner* — Tracy Mangialaschi
(74) *Attorney, Agent, or Firm* — Nitin Kaushik

(57) ABSTRACT

The invention relates to the technical field of image processing, and in particular to a method, a system and a device for acquiring a seaweed bed area, and a storage medium. In the acquisition method, firstly, an initial seaweed bed image with fog is firstly subjected to the fog thickness removal which is convenient for quick calculation, checking whether the quality of the fog thickness removal chart meets the requirements. If the quality of fog thickness removal chart is not up to the standard, a more detailed fog concentration removal method is used to improve the image quality of the initial seaweed bed image until the fog concentration removal chart is up to the standard and then feature extraction is performed. If the quality of fog thickness removal chart is up to the standard, the feature extraction is performed directly.

6 Claims, No Drawings

METHOD, SYSTEM AND DEVICE FOR ACQUIRING SEAWEED BED AREA, AND STORAGE MEDIUM

CROSS-REFERENCE TO RELATED APPLICATIONS

The application claims priority to Chinese patent application No. 2024101215381, filed on Jan. 30, 2024, the entire contents of which are incorporated herein by reference.

TECHNICAL FIELD

The invention relates to the technical field of image processing, and in particular to a method, a system and a device for acquiring a seaweed bed area, and a storage medium.

BACKGROUND

Seaweed bed is a key component of the marine ecosystem, which is very important to marine biodiversity and ecological balance. In order to effectively manage and protect the seaweed bed, it is necessary to monitor and study the seaweed bed. It is necessary to obtain the seaweed bed area irregularly in order to monitor and protect the seaweed bed.

Manual field measurements of the seaweed area are time consuming and costly. Therefore, the seaweed bed area will be extracted by analyzing the remote sensing images of previous seaweed bed regions. However, sometimes influenced by light conditions, water quality and weather, some fog-like textures may appear on the obtained images of seaweed bed, which may affect the extraction of seaweed bed area. If manually delineating the seaweed bed area in the images, not only a lot of time and energy are needed, but more importantly, it is vulnerable to subjective influences, which reduces the accuracy and stability of the acquisition of seaweed bed area results.

SUMMARY

It is an object of the invention to provide a method, a system and a device for acquiring a seaweed bed area, and a storage medium.

The technical solution of the invention is as follows.

A method for acquiring a seaweed bed area, including the operations of:

S1, acquiring an initial seaweed bed image of a region to be measured, and removing the fog thickness in the initial seaweed bed image to obtain a fog thickness removal chart; performing a first quality evaluation on the fog thickness removal chart based on the brightness to obtain a first score, and judging whether the first score exceeds a first score threshold; if so, executing S3; if not, executing S2;

wherein the operation of obtaining the first score comprises dividing the fog thickness removal chart into a plurality of block regions, and performing multi-filtering on all the block regions to obtain a filtered region block set; obtaining a brightness similarity between each filtered region block and the corresponding initial block based on a brightness mean value of each filtered region block in the filtered region block set and a brightness mean value of the corresponding initial block of the each filtered region block in the initial seaweed bed image; respectively multiplying all the brightness similarities by a weight value of a corresponding filtered region block and then summing to obtain a brightness quality score which serves as the first score;

S2, removing a fog concentration in the initial seaweed bed image to obtain a fog concentration removal chart; performing second quality scoring processing on the fog concentration removal chart based on the pixel standard deviation to obtain a second score, and judging whether the second score exceeds a second score threshold; if so, executing S3; if not, executing the S2;

S3, acquiring low-level semantic features and high-level semantic features of the fog thickness removal chart or the fog concentration removal chart, and after fusion, performing receptive field expansion processing to obtain a first semantic feature graph; after depth scaling the first semantic feature graph, performing global feature extraction to obtain a second semantic feature graph; fusing different scales of pooling graphs of the second semantic feature graph to obtain a feature seaweed bed graph;

S4, acquiring a pixel change value of each position point compared with a previous position point in the feature seaweed bed graph, obtaining a pixel difference corresponding to each position point, all the pixel differences and all the corresponding position points, and forming a pixel difference distribution map; acquiring, as an edge point, a position point in the pixel difference distribution map where the pixel difference is greater than a pixel difference threshold; obtaining a seaweed bed region based on all the edge points; and S5, obtaining a seaweed bed area based on the seaweed bed region and an image scale.

The operation of removing the fog thickness in the initial seaweed bed image in the S1 comprises: obtaining a transmittance corresponding to each position point based on the acquired fog thickness of each position point in the initial seaweed bed image; and subtracting a first atmospheric light value from the initial pixel value of each position point in the seaweed bed image, and dividing same by the transmittance of the corresponding position point to obtain the fog thickness removal chart.

The operation of removing a fog concentration in the initial seaweed bed image in the S2 comprises: obtaining a diffraction rate of each position point based on an acquired minimum value of a dark channel of the initial seaweed bed image; obtaining a fog concentration of each position point based on the diffraction rate and the pixel value of each position point; and subtracting the pixel value of each position point from the fog concentration in the initial seaweed bed image, and dividing same by the diffraction rate of the corresponding position point to obtain the fog concentration removal chart.

In the S1, the S1 comprises, if the first score exceeds the first score threshold, acquiring a structural similarity between each filtered region block and the corresponding initial block, and obtaining an optimized similarity between each filtered region block and the corresponding initial block after multiplying the structural similarity and the brightness similarity between each filtered region block and the corresponding initial block; respectively multiplying all the optimized similarities by a weight value of a corresponding filtered region block, and then summing to obtain an optimized first score; and judging whether the optimized first score exceeds the first score threshold; if so, executing the S3; and if not, executing the S2.

The operation of global feature extraction in the S3 comprises: after the first semantic feature graph is subjected to the depth scaling, subjecting the obtained scaled semantic feature graph to convolution and down-sampling to obtain a first down-sampling graph; subjecting the first down-sampling graph to the convolution and down-sampling to obtain a second down-sampling graph; subjecting the second down-sampling graph to the convolution and down-sampling to obtain a third down-sampling graph; after the third down-sampling graph is subjected to convolution and up-sampling, subjecting the third down-sampling graph to splicing processing to obtain a third fused feature image; after the third fused feature image is subjected to the convolution and up-sampling, subjecting the third fused feature image to splicing with the second down-sampling image to obtain a second fused feature image; and after the second fused feature image is subjected to the convolution and up-sampling, subjecting the second fused feature image to splicing with the first down-sampling graph to obtain the semantic feature graph.

The third down-sampling graph, and/or the third fused feature image, and/or the second fused feature image, after the convolution and up-sampling processing, are subjected to attention processing, and the obtained third attention feature graph, and/or second attention feature graph, and/or first attention feature graph are respectively subjected to splicing with the third down-sampling graph, and/or the second down-sampling graph, and/or the first down-sampling graph; wherein the operation of the attention processing specifically comprises sequentially subjecting the feature input graph subjected to the convolution and up-sampling to channel attention processing and spatial attention processing so as to obtain an attention feature graph for executing the splicing.

In the S2, the operation of obtaining the second score comprises: dividing the fog concentration removal chart into a plurality of block regions, and performing multi-filtering on all the block regions to obtain a fog-concentration-removal filtered region block set; obtaining a contrast similarity between each fog-concentration-removal filtered region block and the corresponding initial block based on the pixel standard deviation of each fog-concentration-removal filtered region block in the fog-concentration-removal filtered region block set and the pixel standard deviation of the corresponding initial block of each fog-concentration-removal filtered region block in the initial seaweed bed image; and respectively multiplying all the contrast similarities by the weight value of the corresponding fog-concentration-removal filtered region block, and then summing to obtain a fog-concentration-removal contrast quality score as the second score.

A system for acquiring a seaweed bed area includes:
a fog thickness removal and first quality evaluation module configured for removing a fog concentration in the initial seaweed bed image to obtain a fog concentration removal chart; performing second quality scoring processing on the fog concentration removal chart based on the pixel standard deviation to obtain a second score, and judging whether the second score exceeds a second score threshold; if so, executing a feature seaweed bed graph generation module; if not, executing a fog concentration and second quality evaluation module; wherein the operation of obtaining the first score comprises dividing the fog thickness removal chart into a plurality of block regions, and performing multi-filtering on all the block regions to obtain a filtered region block set; obtaining a brightness similarity between each filtered region block and the corresponding initial block based on a brightness mean value of each filtered region block in the filtered region block set and a brightness mean value of the corresponding initial block of the each filtered region block in the initial seaweed bed image; respectively multiplying all the brightness similarities by a weight value of a corresponding filtered region block and then summing to obtain a brightness quality score which serves as the first score;

a fog concentration removal and second quality evaluation module configured for removing a fog concentration in the initial seaweed bed image to obtain a fog concentration removal chart; performing second quality scoring processing on the fog concentration removal chart based on the pixel standard deviation to obtain a second score, and judging whether the second score exceeds a second score threshold; if so, executing a feature seaweed bed graph generation module; if not, executing the fog concentration removal and second quality evaluation module;

a feature seaweed bed graph generation module configured for acquiring low-level semantic features and high-level semantic features of the fog thickness removal chart or the fog concentration removal chart, and after fusion, performing receptive field expansion processing to obtain a first semantic feature graph; after depth scaling the first semantic feature graph, performing global feature extraction to obtain a second semantic feature graph; fusing different scales of pooling graphs of the second semantic feature graph to obtain a feature seaweed bed graph;

a seaweed bed region generation module configured for acquiring a pixel change value of each position point compared with a previous position point in the feature seaweed bed graph, obtaining a pixel difference corresponding to each position point, all the pixel differences and all the corresponding position points, and forming a pixel difference distribution map; acquiring, as an edge point, a position point in the pixel difference distribution map where the pixel difference is greater than a pixel difference threshold; obtaining a seaweed bed region based on all the edge points; and a seaweed bed area generation module configured for obtaining a seaweed bed area based on the seaweed bed region and an image scale.

An apparatus for acquiring a seaweed bed area comprises a processor and a memory, wherein the processor, when executing a computer program stored in the memory, implements the above-mentioned method for acquiring the seaweed bed area.

A computer-readable storage medium for storing a computer program is provided, wherein the computer program when executed by a processor implements the above-mentioned method for acquiring the seaweed bed area.

The invention has the following beneficial effects.

The invention provides a method for acquiring the area of a seaweed bed. Firstly, an initial image of a seaweed bed with fog is firstly subjected to a fog thickness removal which is convenient for quick calculation, so as to check whether the quality of the fog thickness removal chart meets the requirements; if the quality of fog thickness removal chart is not up to the standard, a more detailed fog concentration removal method is used to improve the image quality of the initial seaweed bed image until the fog concentration removal chart is up to the standard and then feature extraction is performed; if the quality of fog thickness removal chart is up to the standard, the feature extraction is performed directly; then, in the process of feature extraction, semantic feature extraction and global feature extraction are used to process the fog thickness removal chart or fog concentration removal chart, so as to obtain the feature seaweed bed graph which has strong information expression ability and is convenient for other seaweed features. Next, based on the pixel difference distribution of the feature seaweed bed graph, the edge points and the area of the seaweed bed region are determined. Finally, the real area of the seaweed bed is obtained based on the area and image scale of seaweed bed graph. The method not only saves time and effort, but also improves the accuracy and stability of seaweed bed area acquisition.

DETAILED DESCRIPTION OF THE EMBODIMENTS

The embodiment provides a method for acquiring a seaweed bed area, including the operations of:

S1, acquiring an initial seaweed bed image of a region to be measured, and generating a fog thickness removal chart; evaluating a first quality of the fog thickness chart based on the brightness to obtain a first score, and judging whether it exceeds a threshold; if so, executing S3; if not, executing S2; wherein the operation of obtaining the first score includes partitioning and multi-filtering the fog thickness chart, calculating a brightness similarity, and finally obtaining a brightness quality score as the first score;

S2, removing the fog concentration in the initial seaweed bed image to obtain a fog concentration removal chart; obtaining a second score based on a pixel standard deviation, and judging whether the second score exceeds a second score threshold; if so, executing S3; if not, executing the S2;

S3, acquiring low-level semantic features and high-level semantic features of the fog thickness removal chart or fog concentration removal chart, and after fusion, performing receptive field expansion processing to obtain a first semantic feature graph; obtaining a second semantic feature graph after depth scaling; obtained a feature seaweed bed graph by fusing different scales of pooling graphs;

S4, acquiring a pixel change value in the feature seaweed bed graph, and generating a pixel difference distribution map; acquiring an edge point; obtaining a seaweed bed region based on all the edge points;

S5, obtaining a seaweed bed area based on the seaweed bed region and an image scale.

S1, an image of a region to be measured is acquired and the fog thickness is removed to obtain a fog thickness removal chart. A first quality evaluation is performed based on the brightness to obtain a first score, and it is judged whether a threshold is exceeded. If so, S3 is executed; and if not, S2 is executed. The first score is obtained by segmenting and filtering the fog thickness removal chart, calculating the brightness similarity of each filtered region block to an original block, and weighting and summing them.

Remote sensing images of seaweed bed in the region to be measured are obtained as the initial images of seaweed bed, which are affected by weather or water quality and other factors. The fog in the initial images of seaweed bed affects the quality of the images of seaweed bed.

In order to solve the above-mentioned technical problem, firstly, fog thickness removal is performed on the initial seaweed bed image, and then quality evaluation is performed on the fog thickness removal chart to judge whether the image quality meets the requirements; if so, S3 is performed; and if not, S2 is performed.

According to the operation of removing the fog thickness in the initial seaweed bed image, a transmittance is obtained based on the fog thickness. The fog thickness removal chart is obtained by subtracting a first atmospheric light value from the initial pixel value of each position point in the initial seaweed bed image and dividing same by the transmittance of the corresponding position point.

The fog removal thickness at a certain point in the fog thickness removal chart may be obtained by the following formula: $p_{1j}=(p_{0j}-c_1)/t_j$, where $p_{1j}$ is a pixel value of a position point j after fog thickness removal; $p_{0j}$ is an initial pixel value of the position point j; $c_1$ is a first atmospheric light value; $t_j$ is a transmittance of the position point j, $t_j=e^{-\beta h_j}$, where $\beta$ is a fog parameter; $h_j$ is a fog thickness of the position point j, $h_j=-\log(1-(1-\alpha)/c_1)$, where $\alpha$ is a camera adjustment parameter. The first atmospheric light value is a pixel value corresponding to a position point in the initial seaweed bed image where the pixel value is lowest in the grayed initial seaweed bed image.

In order to reduce color deviation and improve calculation efficiency, prior to the operation of removing fog thickness in the initial seaweed bed image, histogram equalization and color space conversion are also performed on the initial seaweed bed image.

First, the fog thickness removal chart is adjusted to the same size as the initial seaweed bed image, and they are divided into a plurality of block regions, respectively.

Then, all the block regions of the fog thickness removal chart are subjected to multi-filtering to obtain a filtered region block set. This process may be implemented by Gaussian filtering.

Then, the mean value of the brightness of each filtered region block is combined with the mean value of the brightness of the corresponding initial block in the initial seaweed bed image to obtain the similarity of the brightness of the filtered region block of each fog thickness removal chart with the corresponding initial block. The brightness similarity between the filtered region block and the corresponding initial block can be obtained by the following calculation formula: $L_{1i}=(2\mu_{xi}\mu_{yi}+C_1)/(\mu_{xi}^2+\mu_{yi}^2+C_1)$, where $L^{1i}$ is a brightness similarity between an $i^{th}$ filtered region block and the corresponding initial block; $\mu_{xi}$ μ xi is a mean value of a brightness value of an $i^{th}$ initial block; $\mu_{yi}$ is the mean value of the brightness value of the $i^{th}$ filtered region block; and $C_1$ is a first dynamic constant.

In addition, in order to ensure that the fog thickness removal chart can be well extracted in features, if the first score exceeds the first score threshold, structural similarity and optimized similarity are calculated to obtain an optimized first score. It is judged whether the optimized first score exceeds the first score threshold. If so, S3 is executed; and if not, S2 is executed.

According to the operation of obtaining the structural similarity between each filtered region block and the corresponding initial block, the structural similarity between each filtered region block and the corresponding initial block is obtained based on the pixel standard deviation of the filtered region block set, the pixel standard deviation of the corresponding initial block, and the pixel covariance of the corresponding initial block.

The structural similarity between a filtered region block and a corresponding initial block can be obtained by the following calculation formula: $L_{2i}=(2\sigma_{xyi}+C_2)(\sigma_{xi}+\sigma_{yi}+C_2)$, where $L_{2i}$ is a structural similarity between the $i^{th}$ filtered region block and the corresponding initial block; $\sigma_{xyi}$ is a pixel covariance between the $i^{th}$ filtered region block and an $i^{th}$ initial block; $\sigma_{xi}$ is a pixel standard deviation of the $i^{th}$ initial block; $\sigma_{yi}$ is the pixel standard deviation of the $i^{th}$ filtered region block; and $C_1$ is a second dynamic constant.

To further ensure that the fog thickness removal chart can be well extracted in features, if the optimized first score exceeds the first score threshold, contrast similarity and optimal similarity are obtained. After multiplying all the optimal similarities with the weight values of the corresponding filtered region blocks respectively, summation processing is performed to obtain an optimal first score, it is judged whether the optimal first score exceeds a first score threshold. If so, S3 is executed; and if not, S2 is executed.

The contrast similarity between a filtered region block and a corresponding initial block can be obtained by the following calculation formula: $L_{3i}=(2\sigma_{xi}\sigma_{yi}+C_3)(\sigma_{xi}+\sigma_{yi}+C_3)$, where $L_{3i}$ is a contrast similarity between the $i^{th}$ filtered region block and the corresponding initial block; $\sigma_{xi}$ is a pixel standard deviation of the $i^{th}$ initial block; $\sigma_{yi}$ is a pixel standard deviation of the $i^{th}$ filtered region block; and $C_3$ is a third dynamic constant.

It is judged whether the brightness quality score or the optimized first score or the optimal first score exceeds a pre-set first score threshold. If so, S3 is executed; and if not, S2 is executed.

If the fog thickness removal chart can be used to perform the operation of S3, it includes performing color correction and detail enhancement on the fog thickness removal chart before acquiring the low-level semantic features and the high-level semantic features of the fog thickness removal chart.

The color correction can eliminate the hue deviation in the fog thickness removal chart and make the fog thickness removal chart more in line with the color under real lighting conditions. The operation of color correction includes acquiring a color temperature difference and a channel gain of the fog thickness removal chart; obtaining the white balance coefficient based on the channel gain; dividing the pixel value of each position point in the fog thickness removal chart by a corresponding white balance coefficient to obtain the updated pixel value of each position point, realizing the process of color correction, and obtaining the color-corrected fog thickness removal chart.

The detail enhancement can highlight texture details and facilitate feature extraction. According to the operation of detail enhancement, the fog thickness removal chart is processed by the gaussian blurring to obtain a smooth image. Then the pixel value subtraction processing is performed on the fog thickness removal chart and the smooth image to obtain a detail image. Finally, the detail image is superimposed on the fog thickness removal chart to achieve detail enhancement.

S2, the fog concentration in the initial seaweed bed image is removed to obtain a fog concentration removal chart; a second scoring processing is performed on the pixel standard deviation based on the pixel standard deviation to obtain a second score, and it is judged whether the second score threshold is exceeded. If so, S3 is executed; and if not, the S2 is executed.

When the initial seaweed bed image is not suitable for the fog thickness removal, the fog concentration removal needs to be performed, and the quality evaluation is performed. If the evaluation score meets the standard, the image feature extraction in S3 is directly performed. If the evaluation score does not meet the standard, the fog concentration removal continues until meeting the standard.

According to the operation of fog concentration removal, a diffraction rate is obtained based on the minimum value of the dark channel of the image. The fog concentration of each position point is obtained based on the diffraction rate and the pixel value. The fog concentration removal chart is obtained by subtracting the pixel value from the fog concentration and dividing by the diffraction rate.

Firstly, the initial seaweed bed image is grayed to obtain the initial seaweed bed grayed map. The minimum value of gray value in the gray chart of initial seaweed bed is obtained as the dark channel minimum to obtain the diffraction rate of each position point. The diffraction rate of each position point can be obtained by the following equation: $T_j=1-w_j\cdot a$, where $T_j$ is a diffraction rate at a position j; $w_j$ is a weight at the position j; and a is a dark channel minimum.

Then, the corresponding pixel value in the gray chart of the initial seaweed bed at the position point corresponding to the dark channel minimum is the second atmospheric light value so as to obtain the fog concentration corresponding to each position point. The fog concentration corresponding to each position point can be obtained by the following formula: $A_j=p_{0j}/T_j+b$, where $A_j$ is a fog concentration at a position point j; $p_{0j}$ is an initial pixel value (a pixel value in the initial seaweed bed gray chart) at a position point j; a is a dark channel minimum; $T_j$ is a diffraction rate at a position point j; and b is a second atmospheric light value.

Finally, a fog concentration removal chart is obtained after subtracting the pixel value of each position point from the corresponding fog concentration in the initial seaweed bed image, and dividing same by the diffraction rate of the position point, which can be achieved by the following formula: $p_{2j}=(p_{0j}-A_j)/T_j$. $p_{2j}$ is a pixel value for a position point j after the fog concentration removal.

The contrast similarity between a fog-concentration-removal filtered region block and a corresponding initial block can be obtained by the following calculation formula: $L_{4i}=(2\sigma_{xi}\lambda_{yi}+C_3)/(\sigma_{xi}^2\lambda_{yi}^2+C_3)$, where $L_{4i}$ is a contrast similarity between the $i^{th}$ fog-concentration-removal filtered region block and the corresponding initial block; $\sigma_{xi}$ is a pixel standard deviation of an $i^{th}$ initial block; $\Delta_{yi}$ is a pixel standard deviation of an $i^{th}$ fog-concentration-removal filtered region block; and $C_3$ is a third dynamic constant.

If the fog concentration removal chart can be used to perform the operation of S3, it includes performing color correction and detail enhancement processing on the fog concentration removal chart before acquiring the low-level semantic features and the high-level semantic features of the fog concentration removal chart.

S3, low-level semantic features and high-level semantic features of the fog thickness removal chart or the fog concentration removal chart is acquired. After fusion, receptive field expansion processing is performed to obtain a first semantic feature graph. A second semantic feature graph is obtained by depth scaling and global feature extraction. A feature seaweed bed graph is obtained by fusing different scales of pooling graphs.

Firstly, the low-level semantic features of the fog thickness removal chart or the fog-concentration-removal chart to obtain a low-level semantic feature of the fog thickness removal chart or the fog concentration removal chart. A high-level semantic feature is obtained by an extended convolution. The two features are combined to realize the receptive field expansion processing by the void convolution to obtain a first semantic feature graph.

Then, the global feature extraction is performed after the depth scaling of the first semantic feature graph, and the global information of the seaweed graph is extracted.

According to the operation of the depth scaling, a large number of standard seaweed bed depth images are obtained. The first semantic feature graph is trained and processed by using the convolution neural network to obtain a scaling semantic feature graph.

According to the operation of the attention processing, specifically, a feature input graph subjected to the convolution and up-sampling is sequentially subjected to channel attention processing and spatial attention processing so as to obtain an attention feature graph for executing the splicing.

According to the operation of the channel attention processing, the feature input graph is respectively subjected to global maximum pooling and global average pooling to obtain a first maximum pooling graph and a first average pooling graph. It is weighted and multiplied element by element to obtain the channel attention graph.

According to the operation of spatial attention processing, the channel attention graph is respectively subjected to global maximum pooling, global average pooling and splicing, and then a convolution operation is performed to obtain a spatial convolution graph. The spatial convolution graph and the channel attention graph are multiplied element by element to obtain an attention feature graph.

Finally, the second semantic feature graph is processed by pooling with different scales to obtain pooling feature graphs with different scales. The pooling feature graphs with different scales are fused by splicing to obtain a feature seaweed bed graph.

S4, a pixel change value of each position point compared with a previous position point in the feature seaweed bed graph is acquired to obtain a pixel difference corresponding to each position point, all the pixel differences and all the corresponding position points, and form a pixel difference distribution map. A position point in the pixel difference distribution map where the pixel difference is greater than a pixel difference threshold is acquired as an edge point. A seaweed bed region is obtained based on all the edge points.

Firstly, according to a boundary row or column of the feature seaweed bed graph as a starting row or column, the pixel value of each position point is acquired, and the pixel change value of the adjacent position points is calculated to form a pixel difference distribution map. Then, the edge points of the seaweed bed region are determined according to the position points in the pixel difference distribution map where the pixel difference is greater than the threshold. Next, based on the edge points, a closed region is formed by connecting curves. The region is defined as a seaweed bed region, and the remaining regions are non-seaweed bed regions.

S5, a seaweed bed area is obtained based on the seaweed bed region and an image scale.

The reverse color processing is performed on the seaweed bed region and the non-seaweed bed region in the feature seaweed bed graph. The seaweed bed region is displayed as white, and the non-seaweed bed region is displayed as black. The area corresponding to the white is obtained as an area of the seaweed bed graph. The seaweed bed area can be obtained by calculating according to the area of seaweed bed graph and the image scale.

This embodiment also provides a system for acquiring a seaweed bed area, including:

Firstly, fog removal and brightness evaluation are performed on the initial seaweed bed images to judge whether the quality requirements are satisfied. If satisfied, a feature seaweed bed graph is generated. Otherwise, a fog concentration removal and a second quality evaluation are performed. Then, extracting features and expanding the receptive field are performed to generate a feature seaweed bed graph. Finally, the seaweed bed area is calculated by determining the seaweed bed region based on the pixel difference distribution.

The embodiment also provides an apparatus for acquiring a seaweed bed area including a processor and a memory, wherein the processor, when executing a computer program stored in the memory, implements the above-mentioned method for acquiring the seaweed bed area.

The embodiment also provides a computer-readable storage medium for storing a computer program, wherein the computer program when executed by a processor implements the above-described method for acquiring the seaweed bed area.

This embodiment provides a method for acquiring the area of a seaweed bed. Firstly, an initial image of a seaweed bed with fog is firstly subjected to a fog thickness removal which is convenient for quick calculation, so as to check whether the quality of the fog thickness removal chart meets the requirements; if the quality of fog thickness removal chart is not up to the standard, a more detailed fog concentration removal method is used to improve the image quality of the initial seaweed bed image until the fog concentration removal chart is up to the standard and then feature extraction is performed; if the quality of fog thickness removal chart is up to the standard, the feature extraction is performed directly; then, in the process of feature extraction, semantic feature extraction and global feature extraction are used to process the fog thickness removal chart or fog concentration removal chart, so as to obtain the feature seaweed bed graph which has strong information expression ability and is convenient for other seaweed features. Next, based on the pixel difference distribution of the feature seaweed bed graph, the edge points and the area of the seaweed bed region are determined. Finally, the real area of the seaweed bed is obtained based on the area and image scale of seaweed bed graph. The method not only saves time and effort, but also improves the accuracy and stability of seaweed bed area acquisition.

What is claimed is:

1. A method for acquiring a seaweed bed area, comprising the operations of:
    S1, acquiring an initial seaweed bed image of a region to be measured, and removing a fog thickness in the initial seaweed bed image to obtain a fog thickness removal chart; performing a first quality evaluation on the fog thickness removal chart based on a brightness to obtain a first score, and judging whether the first score exceeds a first score threshold; if so, executing S3; if not, executing S2;
    the operation of removing the fog thickness in the initial seaweed bed image comprises: obtaining a transmittance corresponding to each position point based on an acquired fog thickness of each position point in the initial seaweed bed image; and subtracting a first atmospheric light value from an initial pixel value of each position point in the seaweed bed image, and dividing a resulting value by the transmittance of the corresponding position point to obtain the fog thickness removal chart;
    wherein the operation of obtaining the first score comprises dividing the fog thickness removal chart into a plurality of block regions, and performing multi-filtering on all the block regions to obtain a filtered region block set; obtaining a brightness similarity between each filtered region block and a corresponding initial block based on a brightness mean value of each filtered region block in the filtered region block set and a brightness mean value of a corresponding initial block of the each filtered region block in the initial seaweed bed image; respectively multiplying all the brightness similarities by a weight value of a corresponding filtered region block and then summing to obtain a brightness quality score which serves as the first score;

S2, removing a fog concentration in the initial seaweed bed image to obtain a fog concentration removal chart; performing second quality scoring processing on the fog concentration removal chart based on a pixel standard deviation to obtain a second score, and judging whether the second score exceeds a second score threshold; if so, executing S3; if not, executing the S2;

wherein the operation of removing the fog concentration in the initial seaweed bed image comprises: obtaining a diffraction rate of each position point based on an acquired minimum value of a dark channel of the initial seaweed bed image; obtaining the diffraction rate of each position point by an equation: $T_j=1-w_j \cdot a$, where $T_j$ is the diffraction rate of position point j, $w_j$ is a weight value of the position point j, and a is a minimum value of the dark channel; obtaining the fog concentration of each position point based on the diffraction rate and a pixel value of each position point; obtaining the fog concentration corresponding to each position point by an equation: $A_j=p0j/T_j+b$, where $A_j$ is a fog concentration of position point j, $p_{0j}$ is an initial pixel value of position point j, and b is a second atmospheric light value; subtracting the pixel value of each position point from the fog concentration in the initial seaweed bed image, and dividing a resulting value by the diffraction rate of the corresponding position point to obtain the fog concentration removal chart;

the operation of obtaining the second score comprises: dividing the fog concentration removal chart into a plurality of block regions, and performing multi-filtering on all the block regions to obtain a fog concentration removal filtered region block set; obtaining a contrast similarity between each fog concentration removal filtered region block and a corresponding initial block based on the pixel standard deviation of each fog concentration removal filtered region block in the fog concentration removal filtered region block set and a pixel standard deviation of the corresponding initial block of each fog concentration removal filtered region block in the initial seaweed bed image; and respectively multiplying all the contrast similarities by a weight value of the corresponding fog-concentration-removal filtered region block, and then summing to obtain a fog concentration removal contrast quality score as the second score;

S3, acquiring low-level semantic features and high-level semantic features of the fog thickness removal chart or the fog concentration removal chart, and after fusion, performing receptive field expansion processing to obtain a first semantic feature graph; after depth scaling the first semantic feature graph, performing global feature extraction to obtain a second semantic feature graph; fusing different scales of pooling graphs of the second semantic feature graph to obtain the feature seaweed bed graph;

S4, acquiring a pixel change value of each position point compared with a previous position point in the feature seaweed bed graph, obtaining a pixel difference corresponding to each position point, all the pixel differences and all the corresponding position points, and forming a pixel difference distribution map; acquiring, as an edge point, a position point in the pixel difference distribution map where the pixel difference is greater than a pixel difference threshold; obtaining a seaweed bed region based on all the edge points; and S5, obtaining a seaweed bed area based on the seaweed bed region and an image scale.

2. The method for acquiring the seaweed bed area according to claim 1, wherein the S1 comprises, if the first score exceeds the first score threshold, acquiring a structural similarity between each filtered region block and a corresponding initial block, and obtaining an optimized similarity between each filtered region block and the corresponding initial block after multiplying the structural similarity and the brightness similarity between each filtered region block and the corresponding initial block;

respectively multiplying all the optimized similarities by a weight value of a corresponding filtered region block, and then summing to obtain an optimized first score; and judging whether the optimized first score exceeds the first score threshold; if so, executing the S3; and if not, executing the S2.

3. The method for acquiring the seaweed bed area according to claim 1, wherein the operation of global feature extraction in the S3 comprises:

after the first semantic feature graph is subjected to the depth scaling, subjecting the obtained scaled semantic feature graph to convolution and down-sampling to obtain a first down-sampling graph; subjecting the first down-sampling graph to the convolution and down-sampling to obtain a second down-sampling graph; subjecting the second down-sampling graph to the convolution and down-sampling to obtain a third down-sampling graph;

after the third down-sampling graph is subjected to convolution and up-sampling, subjecting the third down-sampling graph to splicing processing to obtain a third fused feature image; after the third fused feature image is subjected to the convolution and up-sampling, subjecting the third fused feature image to splicing with the second down-sampling image to obtain a second fused feature image; and after the second fused feature image is subjected to the convolution and up-sampling, subjecting the second fused feature image to splicing with the first down-sampling graph to obtain the semantic feature graph.

4. The method for acquiring the seaweed bed area according to claim 3, wherein at least one of the third down-sampling graph, the third fused feature image, or the second fused feature image, after the convolution and up-sampling processing, are subjected to attention processing, and at least one of an obtained third attention feature graph, a second attention feature graph, or a first attention feature graph are respectively subjected to splicing with at least one of the third down-sampling graph, the second down-sampling graph, or the first down-sampling graph;

wherein the operation of the attention processing specifically comprises sequentially subjecting a feature input graph subjected to the convolution and up-sampling to channel attention processing and spatial attention processing to obtain an attention feature graph for executing the splicing.

5. A device for acquiring a seaweed bed area, comprising a processor and a memory, wherein the processor, when executing a computer program stored in the memory, implements the method for acquiring the seaweed bed area according to claim 1.

6. A system for acquiring a seaweed bed area, comprising:
a fog thickness removal and first quality evaluation module configured for removing a fog thickness in the initial seaweed bed image to obtain a fog thickness removal chart; performing second quality scoring processing on the fog thickness removal chart based on a pixel standard deviation to obtain a first score, and judging whether the first score exceeds a first score threshold; if so, executing a feature seaweed bed graph generation module; if not, executing a fog concentration removal and second quality evaluation module; wherein the operation of removing the fog thickness in the initial seaweed bed image comprises: obtaining a transmittance corresponding to each position point based on an acquired fog thickness of each position point in the initial seaweed bed image; and subtracting a first atmospheric light value from an initial pixel value of each position point in a seaweed bed image, and dividing a resulting value by the transmittance of a corresponding position point to obtain a fog thickness removal chart; wherein the operation of obtaining the first score comprises dividing the fog thickness removal chart into a plurality of block regions, and performing multi-filtering on all the block regions to obtain a filtered region block set; obtaining a brightness similarity between each filtered region block and a corresponding initial block based on a brightness mean value of each filtered region block in the filtered region block set and a brightness mean value of a corresponding initial block of the each filtered region block in the initial seaweed bed image; respectively multiplying all the brightness similarities by a weight value of a corresponding filtered region block and then summing to obtain a brightness quality score which serves as the first score;

the fog concentration removal and second quality evaluation module configured for removing a fog concentration in the initial seaweed bed image to obtain a fog concentration removal chart; performing second quality scoring processing on the fog concentration removal chart based on a pixel standard deviation to obtain a second score, and judging whether the second score exceeds a second score threshold; if so, executing the feature seaweed bed graph generation module; if not, executing the fog concentration removal and second quality evaluation module; wherein the operation of removing a fog concentration in the initial seaweed bed image comprises: obtaining a diffraction rate of each position point based on an acquired minimum value of a dark channel of the initial seaweed bed image; obtaining the diffraction rate of each position point by an equation: $T_j=1-w_j \cdot a$, where $T_j$ is the diffraction rate of position point j, $w_j$ is a weight value of the position point j, and a is a minimum value of dark channel; obtaining a fog concentration of each position point based on the diffraction rate and a pixel value of each position point; obtaining the fog concentration corresponding to each position point by an equation: $A_j=p0j/T_j+b$, where $A_j$ is the fog concentration of the position point j, $p_{0j}$ is an initial pixel value of position point j, and b is a second atmospheric light value; subtracting a pixel value of each position point from the fog concentration in the initial seaweed bed image, and dividing a resulting value by the diffraction rate of a corresponding position point to obtain the fog concentration removal chart; the operation of obtaining the second score comprises: dividing the fog concentration removal chart into a plurality of block regions, and performing multi-filtering on all the block regions to obtain a fog concentration removal filtered region block set; obtaining a contrast similarity between each fog concentration removal filtered region block and the corresponding initial block based on a pixel standard deviation of each fog concentration removal filtered region block in the fog concentration removal filtered region block set and the pixel standard deviation of the corresponding initial block of each fog concentration removal filtered region block in the initial seaweed bed image; and respectively multiplying all the contrast similarities by a weight value of a corresponding fog concentration removal filtered region block, and then summing to obtain a fog concentration removal contrast quality score as the second score;

the feature seaweed bed graph generation module configured for acquiring low-level semantic features and high-level semantic features of the fog thickness removal chart or the fog concentration removal chart, and after fusion, performing receptive field expansion processing to obtain a first semantic feature graph; after depth scaling the first semantic feature graph, performing global feature extraction to obtain a second semantic feature graph; fusing different scales of pooling graphs of the second semantic feature graph to obtain a feature seaweed bed graph;

a seaweed bed region generation module configured for acquiring a pixel change value of each position point compared with a previous position point in the feature seaweed bed graph, obtaining a pixel difference corresponding to each position point, all the pixel differences and all the corresponding position points, and forming a pixel difference distribution map; acquiring, as an edge point, a position point in the pixel difference distribution map where the pixel difference is greater than a pixel difference threshold; obtaining a seaweed bed region based on all the edge points; and a seaweed bed area generation module configured for obtaining the seaweed bed area based on the seaweed bed region and an image scale.

* * * * *